United States Patent
Vernon-Harcourt et al.

(10) Patent No.: US 11,168,513 B2
(45) Date of Patent: Nov. 9, 2021

(54) METHOD AND APPARATUS FOR MAKING A COMPOSITE PIPE

(71) Applicant: Magma Global Limited, Portsmouth (GB)

(72) Inventors: Edward William Vernon-Harcourt, Steyning (GB); Daniel Mark Maynard, Huntingdon (GB)

(73) Assignee: Magma Global Limited, Portsmouth (GB)

( * ) Notice: Subject to any disclaimer, the term of this patent is extended or adjusted under 35 U.S.C. 154(b) by 114 days.

(21) Appl. No.: 16/632,518

(22) PCT Filed: Jul. 19, 2018

(86) PCT No.: PCT/GB2018/052045
§ 371 (c)(1),
(2) Date: Jan. 20, 2020

(87) PCT Pub. No.: WO2019/016554
PCT Pub. Date: Jan. 24, 2019

(65) Prior Publication Data
US 2020/0207008 A1   Jul. 2, 2020

(30) Foreign Application Priority Data
Jul. 21, 2017 (GB) ..................... 1711755

(51) Int. Cl.
*B29C 53/58* (2006.01)
*E06B 3/50* (2006.01)
(Continued)

(52) U.S. Cl.
CPC .......... *E06B 3/5063* (2013.01); *B29C 53/582* (2013.01); *B29C 53/68* (2013.01);
(Continued)

(58) Field of Classification Search
None
See application file for complete search history.

(56) References Cited

U.S. PATENT DOCUMENTS

| 5,562,788 A * | 10/1996 | Kitson ................... B29C 70/384 |
| | | 156/378 |
| 2005/0039843 A1* | 2/2005 | Johnson ................. B29C 70/32 |
| | | 156/175 |
| 2012/0300221 A1* | 11/2012 | Bennison ............... G01B 11/14 |
| | | 356/601 |

FOREIGN PATENT DOCUMENTS

| GB | 2537402 | 10/2016 |
| JP | 61-123414 | 6/1986 |

(Continued)

OTHER PUBLICATIONS

Mallick, P. K., "Fiber-Reinforced Composites: Materials, Manufacturing, and Design," Section 5.8, "Manufacturing Processes for Thermoplastic Matrix Composites," pp. 422-426 (3d ed. CRC Press, 2007).

*Primary Examiner* — Jeffry H Aftergut
(74) *Attorney, Agent, or Firm* — Levy & Grandinetti

(57) ABSTRACT

A method of making a composite pipe has the steps of (a) providing one or more sources of composite tape, the composite tape being formed of reinforcing fibres embedded in a thermoplastic matrix; (b) helically winding the composite tape(s) around a cylinder under the application of heat to form a pipe comprising fused, concentric layers of adjacently positioned, helically-wound composite tape; (c) scanning a region where edges of wound composite tape are expected to be, to generate scanning information; (d) controlling the gap between further adjacent windings by (1) using the scanning information to determine wound composite tape edge position(s), and (2) using the determined wound composite tape edge position(s) to adjust the winding (Continued)

process during winding; (e) repeating steps (c) and (d). The invention also relates to a corresponding apparatus for making a composite pipe.

19 Claims, 3 Drawing Sheets

(51) Int. Cl.
| | |
|---|---|
| *E05D 13/00* | (2006.01) |
| *E05D 15/48* | (2006.01) |
| *E05F 1/16* | (2006.01) |
| *E06B 3/44* | (2006.01) |
| *E06B 7/16* | (2006.01) |
| *B29C 53/68* | (2006.01) |
| *B29C 53/80* | (2006.01) |
| *B29K 71/00* | (2006.01) |
| *B29K 307/04* | (2006.01) |
| *B29K 309/08* | (2006.01) |
| *B29L 23/00* | (2006.01) |

(52) U.S. Cl.
CPC ...... *B29C 53/8041* (2013.01); *E05D 13/1207* (2013.01); *E05D 15/48* (2013.01); *E05F 1/16* (2013.01); *E06B 3/4407* (2013.01); *E06B 3/509* (2013.01); *E06B 7/16* (2013.01); *B29K 2071/00* (2013.01); *B29K 2307/04* (2013.01); *B29K 2309/08* (2013.01); *B29L 2023/22* (2013.01); *E05D 2015/485* (2013.01); *E05D 2015/487* (2013.01); *E05Y 2900/148* (2013.01)

(56) References Cited

FOREIGN PATENT DOCUMENTS

| | | |
|---|---|---|
| WO | WO 2012/079993 | 6/2012 |
| WO | WO 2012/118378 | 9/2012 |
| WO | WO 2016/092270 | 6/2016 |

* cited by examiner

METHOD AND APPARATUS FOR MAKING A COMPOSITE PIPE

FIELD OF THE INVENTION

The invention relates to a method and apparatus for making composite pipe.

DESCRIPTION OF THE RELATED ART

Subsea oil and gas drilling and development employs pipes to transport liquid and/or gaseous hydrocarbons from the seabed to the sea surface and to transport injection fluids from the surface to the seabed. Traditionally, these pipes have typically been made from steel or from combinations of materials, such as steel wires combined with a plastic liner, which together form a flexible steel pipe.

Over time, the subsea depths at which hydrocarbons are extracted has tended to increase. This development has been accompanied by a need to handle more aggressive fluids, higher operating pressures and harsher environmental conditions. Furthermore, in the case of very long pipes suitable to be used at large depths, the weight of the pipe itself becomes significant and may be a disadvantageous factor. In order to address these challenges, the industry has turned to composite pipes, comprising fibre-reinforced polymer. Reference may be made to WO 2012/079993 A1 which discloses such composite pipes. These pipes are typically lighter and better able to withstand the more severe environments as well as the more complex dynamic loading conditions including tension, bending and internal/external pressure found deep below the sea surface.

Composite pipe may advantageously be manufactured from tape(s) of thermoplastic polymer reinforced with fibres. Layers of these tapes are helically wound onto a cylinder, which is usually a pipe liner, but may instead be a mandrel, to form the composite pipe. During manufacturing, the layers of tape are fused to the underlying liner in the case of the first layer of windings, and then, in the case of subsequent windings, to the underlying tape, to create the pipe wall.

A challenge when winding composite tape(s) is to ensure that they are wound such that a winding exactly abuts adjacent tape winding(s) in order that there is no gap between windings and in order that adjacent windings do not overlap. Gaps typically give rise to voids in the finished product and voids are commonly understood to represent points of weakness, which may be a source of structural failure in use. Overlapping tapes cause surface irregularities which may also cause the creation of voids when further windings are applied over them. Furthermore, the fusing together of tapes requires the application of heat which may cause the pipe to expand or contract during manufacture. Such expansion/contraction may further affect the degree of separation of adjacent composite tape windings.

It is against this background that the present invention has been devised.

SUMMARY OF THE INVENTION

According to a first aspect of the invention, a method of making a composite pipe is provided, comprising the steps of:

a) providing one or more sources of composite tape, the composite tape being formed of reinforcing fibres embedded in a thermoplastic matrix;

b) helically winding the composite tape(s) around a cylinder under the application of heat to form a pipe comprising fused, concentric layers of adjacently positioned, helically-wound composite tape;

c) scanning a region where edges of wound composite tape are expected to be, to generate scanning information;

d) controlling the gap between further adjacent windings by:
  a. using the scanning information to determine wound composite tape edge position(s); and
  b. using the determined wound composite tape edge position(s) to adjust the winding process during winding;

e) repeating steps c) and d).

The method according to the first aspect of the invention involves the provision of one or more sources, preferably reels, of composite tape.

The composite tape is a pre-formed tape comprising a thermoplastic polymer matrix within which are embedded reinforcing fibres. The width of the tape may be from 2 mm to 300 mm, but is typically from 6 mm to 36 mm, preferably from 12 mm to 24 mm; the thickness of the tape is typically from 0.05 mm to 1 mm, preferably from 0.1 mm to 0.8 mm.

The thermoplastic polymer matrix may comprise any suitable thermoplastic polymer, but advantageously comprises and more advantageously consists only of polyether ether ketone (PEEK). PEEK has the advantage of having good resistance acidic and saline environments as well as better stability at high temperatures than many other commercially available polymers. It also demonstrates low permeability to some gases present in subsea hydrocarbon deposits, such as hydrogen sulphide and carbon dioxide. Preventing gas permeation is advantageous, because permeating gases may force their way between concentric layers of the composite pipe, or inside the liner or the thermoplastic matrix, resulting in delamination, blistering and even failure.

The reinforcing fibres embedded in the thermoplastic polymer matrix advantageously comprise and more advantageously consist only of carbon fibres, glass fibres, or mixtures thereof. Advantageously, the fibres are aligned axially along the longitudinal axis of the tape. Preferably, the fibres are continuous fibres.

The method according to the first aspect of the invention comprises the step of helically winding the composite tape(s) around a cylinder to form a pipe comprising concentric layers of adjacently positioned, helically-wound tape(s). It is possible to manufacture a pipe using a single source of composite tape (that is, a single tape), but it is more efficient to provide two or more sources of tape and to wind them simultaneously, especially when manufacturing long pipes of hundreds or thousands of metres in length. The number of windings needed to form a concentric layer will depend upon the angle of winding, the diameter of the pipe and the width of the tape.

The windings of the composite tape are heated to melt and fuse them to the underlying surface, be it the pipe liner, in the case of the first concentric layer of tape, or the underlying concentric layer of composite tape, in the case of subsequent concentric layers of tape. Such heating is performed to one or both of the contact surfaces immediately prior to contact between the surfaces, in a manner known to the skilled person. Reference can be made to Fiber Reinforced Composites, Materials, Manufacture and Design, $3^{rd}$ Edition, P. K. Mallick, 2008, The CRC Press, Section 5.8, Manufacturing Processes for Thermoplastic Matrix Composites. Advantageously, only a thin layer at each surface is heated, since it is disadvantageous to melt the entire tape, as well as wasteful of energy. Melting a thermoplastic polymer may result in altered crystallinity during cooling which may affect properties, such the tape s fracture toughness.

According to the first aspect of the invention, the windings of any given concentric layer may be provided at the same angle or at a different angle to the windings of the immediately preceding concentric layer. The composite tape(s) are wound at an angle of between 15 degrees and 89 degrees to the pipe s longitudinal axis, with an angle from 30 degrees to 55 degrees being preferred to withstand tension and an angle from 55 degrees to 89 degrees being preferred to withstand radial pressure. The skilled person will select the winding angle(s) of the composite tape(s) and the winding angle of the tape(s) in each concentric layer to provide flexibility during handling and optimal mechanical properties in bending tension, hoop stress and torsion.

The cylinder around which the tape(s) are initially wound is typically a pipe liner which forms part of the finished pipe, but it may instead be a mandrel which is subsequently removed and does not form part of the finished pipe. As winding progresses, the cylinder will be the pipe liner or the mandrel covered with underlying windings. The pipe liner may be formed of the same material or of a different material from the matrix of the composite tape. In one embodiment, the pipe liner comprises and it may consist only of the same material as the matrix of the composite tape. By using the same material, a strong bond between the liner layer and the composite layer may be ensured. The pipe liner advantageously comprises and more advantageously consists only of PEEK.

As already mentioned, the objective is to ensure that a tape is wound such that a winding exactly abuts adjacent winding(s) in order that there is no gap between windings and in order that adjacent windings do not overlap. In this fashion, each concentric layer should provide a complete covering of the underlying, immediately preceding concentric layer (or the pipe liner in the case of the first concentric layer). Perfectly abutting windings result in a surface which effectively has no gaps in it and thus no edges. If windings do not perfectly abut, such that there is a gap, then each gap will be defined by two edges. If a winding overlaps another winding, then there will be no gap, but a single raised edge will be presented.

The method according to the first aspect of the invention comprises the step scanning a region where edges of wound composite tape are expected to be, to generate scanning information.

FIG. 2 schematically shows a pipe 1 having some illustrative windings 11 of composite tape(s) as the pipe moves in a conveyance direction, indicated by the arrow. The leading edge 12 of the first winding may be used as a reference edge for all windings in the layer. Knowing the width of the tape(s) allows a prediction of where edges of wound composite tape and the scanning of the region where edges of wound composite tape are expected to be.

A region of pipe comprising already-wound tape is scanned before the winding applicator applies further windings. The step of scanning may comprise an optical method, an electrical method, a magnetic method, a tactile method, an ultrasonic method, or a mixture thereof. The scanning information is used to determine wound composite tape edge positions.

According to one alternative embodiment, the optical method may comprise the steps of:
 projecting light onto the region of the pipe surface where tape edges are expected to be;
 gathering and recording optical information from light reflected by the region where wound tape edges are expected to be;
wherein the optical information is the scanning information used to determine wound composite tape edge position(s).

The light may derive from a suitable source of visible light of known frequency distribution projected at a suitable angle to the pipe surface. The optical information gathered and recorded comprises light reflected from the pipe surface. The analysis of the reflected light may include identifying areas of contrast, especially areas of shadow, which are indicative of a change in surface level. Knowing the strength, frequency distribution and angle of the light source as well as the angle of curvature of the pipe, allows interpretation of the observed regions of shadow and a determination of the location of composite tape edges. Using that information, the numbers, locations and dimensions of the gaps between composite tapes, as well as the locations of composite tape overlaps may be determined. The detection and dimensioning of edges from digital images, for example, is known, so these matters are within the routine capabilities of a person skilled in this art.

According to one alternative, the light projected onto the region of the pipe surface where composite tape edges are expected to be is not provided by an additional light source, but is ambient light, such as the lighting provided on the production line for manufacture of the pipe.

According to a preferred alternative, the light projected onto the region of the pipe surface where composite tape edges are expected to be comprises laser light projected at a suitable angle(s) to the pipe surface. A laser profilometer, such as an ZG2 Smart Sensor, manufactured by Omron Corporation of Kyoto, Japan, may be used.

According to another alternative, the optical method may comprise the step of
 providing the composite tape with a visible marker in step a), which marker may be used to determine composite tape edge positions;
 optionally providing additional illumination of visible marker(s);
 gathering and recording optical information from light reflected by the visible marker(s);
wherein the optical information is the scanning information used to determine wound composite tape edge position(s).

The visible marker may be a line or some other mark provided during or after manufacture of the composite tape. The marker may be located at a composite tape edge or at some other location, such as the centre of the composite tape, provided that the distance from the marker to the composite tape edges is known. The number, location and dimensions of the gaps between composite tapes may then be determined.

In similar fashion, a wire or other electrically or magnetically detectable element may be incorporated into the composite tape during or after manufacture of the composite tape. The element may be located at a composite tape edge or at some other location, such as the centre of the composite tape, provided that the distance from the element to the composite tape edges is known. The number, location and dimensions of the gaps between composite tapes may then be determined.

In a further alternative, a tactile method, such as a stylus may be used to detect the location, number and size of gaps. In a further alternative still, ultrasound may be used to make such a determination.

Advantageously, according to the method of the first aspect of the invention, scanning step c) is performed simultaneously at two axially identical and diametrically opposite locations (that is, separated by 180 degrees). This is done because the pipe may vibrate or otherwise move laterally during manufacturing, which may give rise to inaccurate scanning information. By scanning in the presently defined fashion, if the pipe moves away from one scanning device, then it moves towards the second scanning device, which cancelling out the movement in a first plane. Knowing the angle of curvature of the pipe allows for compensation for a plane at right angles to the first plane. According to the invention, step c) may be performed simultaneously at more than two axially identical and diametrically different locations to provide enhanced compensation for lateral movements of the pipe.

The method according to the first aspect of the invention comprises the step of controlling the gap between further adjacent windings, by
  a. Using the scanning information to determine wound composite tape edge position(s), as described above.
  b. Adjusting the winding process during winding using the determined wound tape edge position(s).

Typically, the present method is performed in a continuous fashion and winding is performed by one or more winding applicator(s), each of which is advantageously in the form of a rotating ring having one or more tape head(s) disposed thereon. The tape head or each tape head is adapted to receive a feed of and applying helical windings of composite tape. The pipe is conveyed through the rotating ring(s) and tape is helically wound onto the pipe via the tape head(s) on the ring or on each ring. Advantageously, there is more than one ring and, more advantageously, each ring comprises more than one tape head. Such an arrangement may allow the simultaneous application of multiple tapes and may be sufficient to manufacture a complete concentric layer in a single pass. In some cases, however, the pipe may nevertheless need to be passed through the winding applicator(s) several times to complete a layer. A composite pipe according to the invention may comprise from tens to hundreds of concentric layers of composite tape.

The step of adjusting the winding process during winding may include altering the rate of rotation of the rotating ring(s) and/or changing the rate at which the pipe is conveyed through the rotating ring(s). If there is more than one ring present, then the speed of rotation of each ring may be adjusted independently of the speed of rotation of the other ring or the other rings.

The steps of the method according to the first aspect of the invention of c) of scanning a region where edges of wound composite tape are expected to be, to generate scanning information and d) of controlling the gap between further adjacent windings, are repeated throughout the process.

According to a second aspect of the invention, an apparatus for making a composite pipe is provided, comprising:
  a) one or more source(s) of composite tape, the composite tape being formed of reinforcing fibres embedded in a thermoplastic matrix;
  b) a winding applicator configured to receive a feed of composite tape from the one or more sources of composite tape and to apply helical windings of composite tape around a cylinder to form a pipe comprising concentric layers of adjacently positioned, helically-wound composite tape;
  c) heating means configured to heat the windings and fuse them together;
  d) a scanning device for scanning a region where composite tape edges are expected to be and generating scanning information;
  e) a controller configured to:
    a. determine wound composite tape edge positions based upon the scanning information; and
    b. adjust the winding process during winding to minimize the gap between further adjacent windings.

The scanning device according to the invention may be an optical scanner, an electrical scanner, a magnetic scanner, a tactile scanner, an ultrasonic scanner, or a mixture thereof.

Advantageously, the scanning device is an optical scanner, which comprises a visible light sensor for receiving reflected light from the pipe surface. The visible light sensor may be a charge-coupled device of the type used in digital cameras or some other light sensor known to the skilled person. The resolution of the camera is selected to be appropriate to the accuracy of edge location required. This is achieved with a high-resolution camera with optics suitable to image the region in which edges of the wound composite are expected to be, with a resolution finer than the accuracy of detection required, typically an order of magnitude finer than the accuracy of detection required, and a high sample rate based on the accuracy of detection required, typically in excess of 100 images per second.

FIG. 3 is an example surface map of a pipe surface generated with a laser profile scanner, giving a three-dimensional image. Tape edges 13 can be seen as dark or light lines running from left to right in the image. The previous concentric layer 14 can also be seen.

Advantageously, the optical scanner comprises visible light sensors at two or more axially identical and diametrically different locations to compensate for lateral movement of the pipe.

Advantageously, the visible light sensor or each visible light sensor is provided with an associated light source, preferably a laser light source, configured to project light onto the surface of the pipe such that the visible light sensor is able to gather and record light reflected by the pipe surface from the associated light source.

According to the second aspect of the invention, the winding applicator is preferably in the form of a rotatable ring having one or more tape head(s) disposed thereon. Furthermore, means are provided to convey the pipe through the rotatable ring in use. In one embodiment, the means to convey the pipe is a winding machine which winds the pipe onto a reel. Advantageously, the apparatus comprises more than one rotatable ring and each ring has more than one tape head disposed upon it, advantageously at least two and more advantageously at least four tape heads. An example of a commercially available machine that may be used to apply multiple tapes at multiple rotary locations is the Ridgway RTP Taping Machine, manufactured by Ridgeway Machines Limited of Leicester, United Kingdom.

According to the second aspect of the invention, a region of pipe comprising already-wound tape is scanned by the scanning device before the winding applicator applies further windings. In other words, the scanning device is located before the winding applicator in the direction of conveyance of the pipe. Locating the scanning device before the winding applicator may have the disadvantage that errors which occur after the scanning device has scanned a region of the pipe and prior to winding will not identified. Errors may, for example, be due to pipe expansion. To avoid this problem, the scanning device may be placed on the winding applicator itself. For the case in which the winding applicator is a ring comprising more than one tape head, then a scanning device may be placed on each tape head.

The apparatus according to the second aspect of the invention advantageously comprises more than one scanning device. More advantageously, the apparatus comprises a scanning device located before of the winding applicator in the direction of conveyance of the pipe and at least one scanning device located on the winding applicator. More advantageously still, for the case in which the winding applicator is a ring comprising more than one tape head, then a scanning device may be placed on each tape head as well.

As already discussed, the windings of the composite tape are heated to melt and fuse them to the underlying surface, be it the pipe liner, in the case of the first concentric layer of tape, or the underlying concentric layer of composite tape, in the case of subsequent concentric layers of tape. A heating device is provided to achieve this, the details of which are known to the skilled person.

BRIEF DESCRIPTION OF THE DRAWINGS

The invention will now be further described, by way of example only, and with reference to the accompanying drawings, in which:

As shown in FIG. 1, pipe 1 disposed on reel 2 is uncoiled and conveyed in conveyance direction 4 to be coiled onto a driven reel 3. In reality, the apparatus may be up to several hundred metres in length. Disposed between reel 2 and driven reel 3 is a winding applicator 5 disposed on rotating ring 6 through which pipe 1 passes. The winding applicator 5 applies composite tape 7 to the pipe 1 at location 8. A scanning device 9 linked to controller 10 scans a region where edges of previously wound composite tape 11 are expected to be. The previously windings 11 may have been wound by a preceding winding applicator (not shown) located before the illustrated winding applicator 5 in the conveyance direction 4 or they may have been wound by the illustrated winding applicator 5 in a previous pass of the pipe through the illustrated winding applicator 5.

Figure 1:
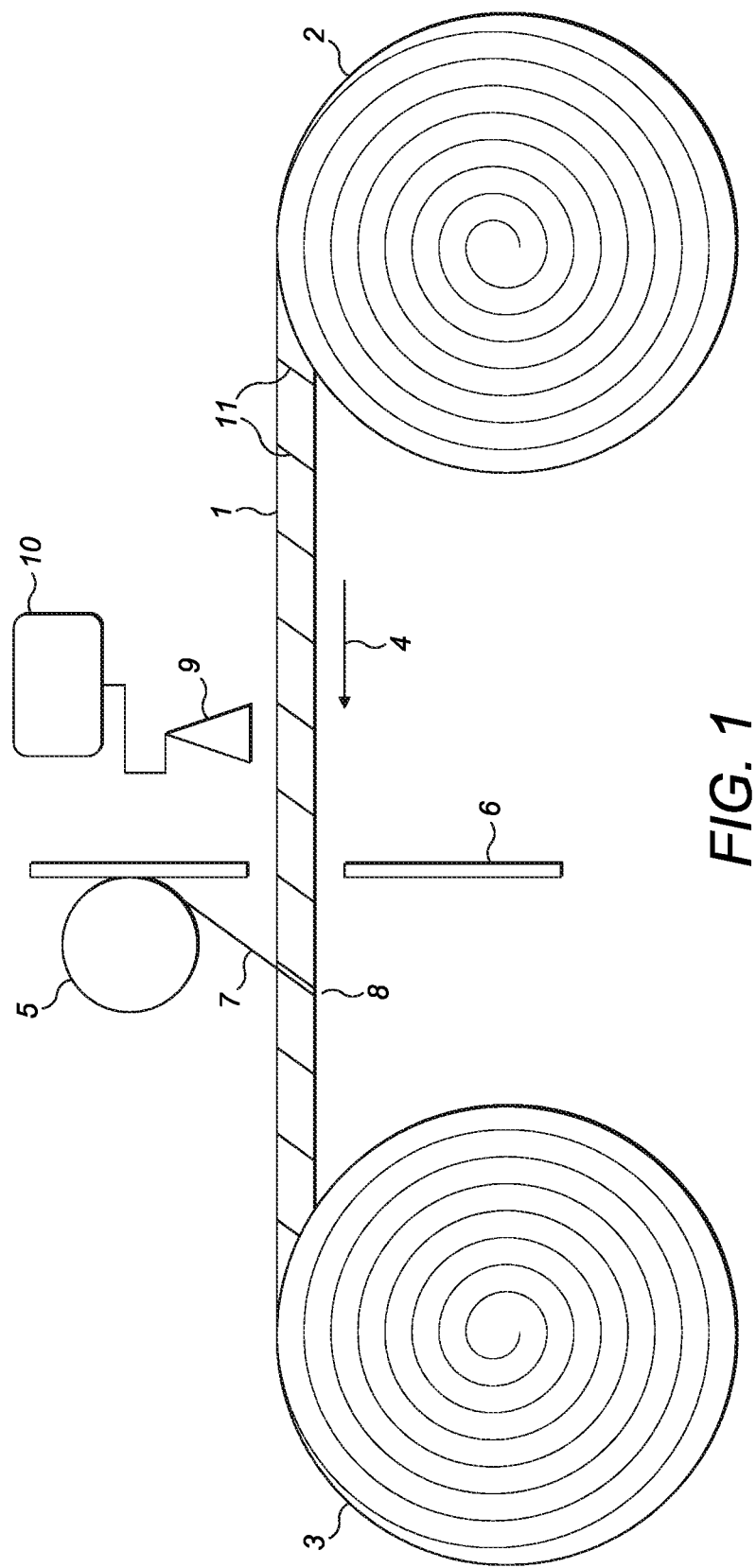
FIG. 1 is a schematic drawing illustrating the method and apparatus of the present invention.
Figure 2:
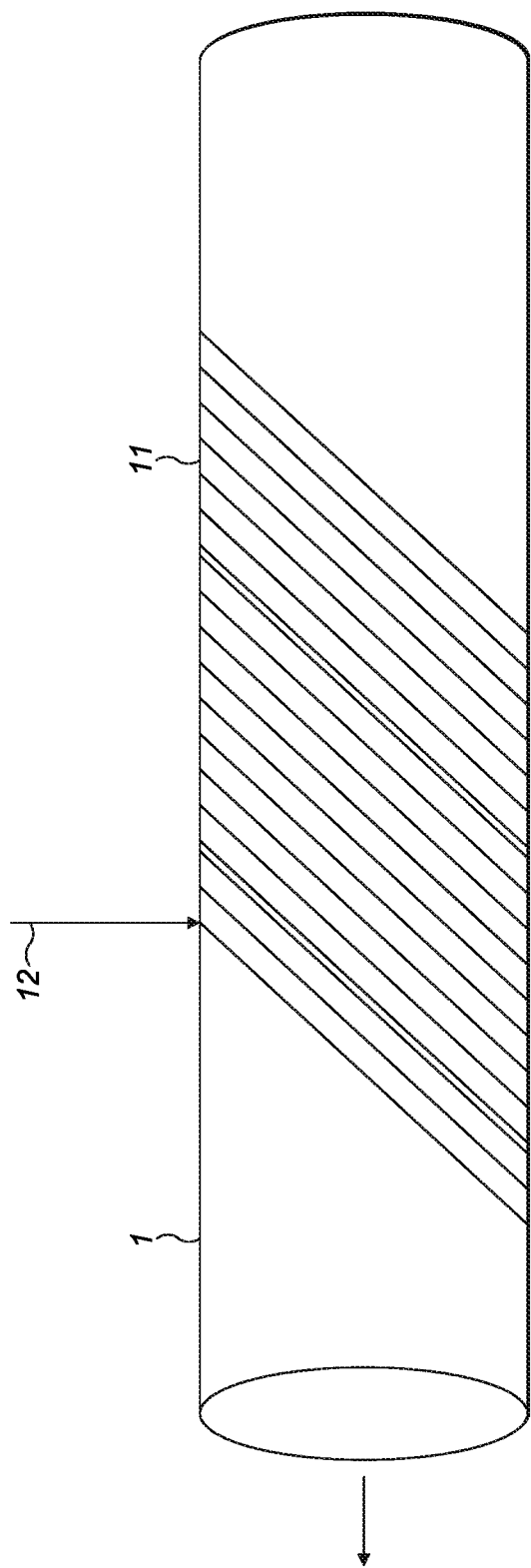
FIG. 2 schematically shows a pipe having some illustrative windings of composite tape.
Figure 3:
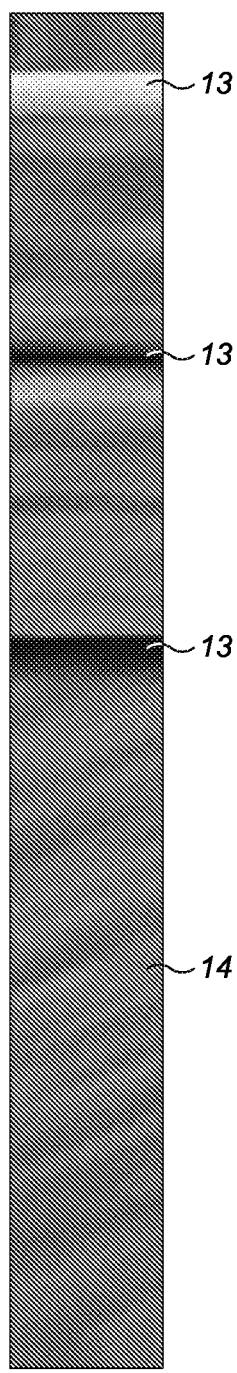
FIG. 3 is a two-dimensional surface map of a pipe surface generated with a profile sensor.

Controller 10 controls the gap between further adjacent windings by using the scanning information gained from scanning device 9 to determine wound composite tape edge position(s) and, using the determined wound composite tape edge position(s), it adjusts the winding process during winding by communicating with and adjusting the rate of winding of winding applicator 5 and/or the rate of winding of the driven reel 3 via control lines (not shown).

The invention claimed is:

1. A method of making a composite pipe, comprising the steps of:
   (a) providing one or more sources of composite tape, the composite tape being formed of reinforcing fibres embedded in a thermoplastic matrix;
   (b) helically winding the composite tape(s) around a cylinder under the application of heat to form a pipe comprising fused, concentric layers of adjacently positioned, helically-wound composite tape;
   (e) scanning a region where edges of wound composite tape are expected to be, to generate scanning information;
   (d) controlling the gap between further adjacent windings by:
      (1) using the scanning information to determine wound composite tape edge position(s); and
      (2) using the determined wound composite tape edge posit on(s) to adjust the winding process during winding;
   repeating steps (c) and (d),
   wherein a winding applicator is provided in the form of a rotating ring, wherein the pipe is conveyed through the rotating ring, wherein one or more tape head(s) are disposed on the rotating ring, and wherein the tape head or each tape head helically winds composite tape(s) around the cylinder as the pipe is conveyed through the rotating ring.

2. The method of claim 1, wherein the step of scanning comprises an optical method, an electrical method, a magnetic method, a tactile method, an ultrasonic method, or a mixture thereof.

3. The method of claim 2, wherein the optical method comprises the steps of:
   projecting light, preferably laser light, onto the region of the pipe surface where composite tape edges are expected to be;
   gathering and recording optical information from light reflected by the region where wound compos tape edges are expected to be;
   wherein the optical information is the scanning information used to determine wound composite tape edge position(s).

4. The method of claim 2, wherein the optical method comprises the step of
   providing the composite tape with a visible marker in step (a), which marker may be used to determine composite tape edge positions;
   optionally providing additional illumination of visible marker(s);
   gathering and recording optical information from light reflected by the visible marker(s);
   wherein the optical information is the scanning information used to determine wound composite tape edge position(s).

5. The method of claim 1, wherein step (c) is performed simultaneously at two or more axially identical and diametrically different locations to compensate for lateral movement of the pipe.

6. The method of claim 1, wherein adjusting the winding process during winding comprises the step of changing the rate of rotation of the rotating ring and/or changing the rate at which the pipe is conveyed through the rotating ring.

7. The method of claim 1, comprising the additional step of providing the windings of any given concentric layer at the same angle or at a different angle to the windings of the immediately preceding concentric layer.

8. The method of claim 1, wherein the thermoplastic matrix is polyether ether ketone (PEEK).

9. The method of claim 1, wherein the reinforcing fibres embedded in the composite are carbon fibres, glass fibres, or mixtures thereof.

10. The method of claim 1, wherein the cylinder is a pipe liner.

11. An apparatus for making a composite pipe comprises:
   (a) one or more source(s) of composite tape, the composite tape being formed of reinforcing fibres embedded in a thermoplastic matrix;
   (b) a winding applicator configured to receive a feed of composite tape from the one or more sources of composite tape and to apply helical windings of composite tape around a cylinder to form a pipe comprising concentric layers of adjacently positioned, helically-wound composite tape;

(c) heating means configured to heat the windings and fuse them together;
(d) a scanning device for scanning a region where composite tape edges are expected to be and generating scanning information;
(e) a controller configured to:
(1) determine wound composite tape edge positions based upon the scanning information; and
(2) adjust the winding process during winding to minimize the gap between further adjacent windings,
wherein the winding applicator is in the form of a rotatable ring having one or more tape head(s) disposed thereon, the tape head or each tape head being configured to helically wind composite tape(s) around the cylinder, and means are provided to convey the pipe in a conveyance direction through the rotatable ring in use.

12. The apparatus of claim 11, comprising more than one scanning device.

13. The apparatus of claim 11, wherein the scanning device comprises an optical scanner, an electrical scanner, a magnetic scanner, a tactile scanner, an ultrasonic scanner, or a mixture thereof.

14. The apparatus of claim 13, wherein the scanner is an optical scanner which comprises a visible light sensor for receiving reflected light from the pipe surface.

15. The apparatus of claim 14, comprising visible light sensors at two or more axially identical and diametrically different locations to compensate for lateral movement of the pipe.

16. The apparatus of claim 14, wherein the visible light sensor or each visible light sensor is provided with an associated light source, preferably a laser light source, configured to project light onto the surface of the pipe such that the visible light sensor is able to gather and record light reflected by the pipe surface from the associated light source.

17. The apparatus according to claim 11, wherein a scanning device is located at one or more of the following locations:

before the winding applicator in the conveyance direction;

on the winding applicator; or on the tape heads.

18. The apparatus of claim 11, Wherein the thermoplastic matrix is polyether ether ketone (PEEK).

19. The apparatus of claim 11, wherein the reinforcing fibres embedded in the composite are carbon fibres, glass fibres, or mixtures thereof.

* * * * *